United States Patent [19]

Christner et al.

[11] Patent Number: 4,746,329

[45] Date of Patent: May 24, 1988

[54] METHANOL FUEL REFORMER

[75] Inventors: Larry G. Christner, Newtown; Steven A. Koehler, Bethel; George Steinfeld, Southbury, all of Conn.

[73] Assignee: Energy Research Corporation, Danbury, Conn.

[21] Appl. No.: 935,180

[22] Filed: Nov. 26, 1986

[51] Int. Cl.$^4$ ................................................. B01J 8/04
[52] U.S. Cl. ........................................ 48/61; 422/191; 422/203; 422/204; 422/211; 429/19
[58] Field of Search ............... 422/203, 204, 202, 190, 422/191, 193, 211, 212, 220; 48/61, 105, 94, 196 A; 429/19

[56] References Cited

U.S. PATENT DOCUMENTS

| | | |
|---|---|---|
| 1,826,548 | 10/1931 | Jaeger . |
| 2,562,993 | 8/1951 | Sensel et al. ........................... 23/288 |
| 3,144,312 | 8/1964 | Mertens ................... 48/105 |
| 3,499,797 | 3/1970 | Hooper ................... 136/86 |
| 3,516,807 | 6/1970 | West et al. ............. 48/107 |
| 3,531,263 | 9/1970 | Sederquist ................. 48/61 |
| 3,541,729 | 11/1970 | Dantowitz .............. 48/94 |
| 3,909,299 | 9/1975 | Corigay ................... 48/94 |
| 4,001,041 | 1/1977 | Menard ................. 429/17 |
| 4,200,682 | 5/1980 | Sederquist .............. 429/17 |
| 4,365,006 | 12/1982 | Baker ..................... 429/17 |
| 4,495,154 | 1/1985 | Christner et al. ........ 422/203 |

*Primary Examiner*—Peter Kratz
*Attorney, Agent, or Firm*—Robin, Blecker & Daley

[57] ABSTRACT

A methanol fuel reformer for use in conjunction with fuel cell power plants comprising a plurality of annular chambers which are interconnected in a manner to promote fuel vaporization, reformation and shift conversion by using fuel cell anode exhaust as the source of heat and steam required for reforming.

10 Claims, 1 Drawing Sheet

METHANOL FUEL REFORMER

The Government has rights in this invention pursuant to Contract No. DAAK70-84-C-0099 awarded by the U.S. Army.

BACKGROUND OF THE INVENTION

This invention relates to fuel reformers and, in particular, to fuel reformers adapted to be used with fuel cell power plants.

In fuel cell power plants, it is generally necessary to employ a reformer to convert hydrocarbon containing liquid fuel to hydrogen gas for use in running the fuel cells of the plant. In one proposed power plant of this type, use is made of the exhaust developed by the anodes of the cells of the power plant to develop heat and steam for the reforming reaction. In particular, the anode exhaust and an oxidant gas are coupled to a burner where the hydrogen is burned to develop heated combustion gases and steam. These products are then fed with pressurized fuel to the reformer wherein reforming of the fuel takes place in the presence of the heat and steam and a suitable reforming catalyst. The resultant output of the reformer is rich in hydrogen and can thus be used as fuel process gas for the fuel cells of the power plant.

In the above proposed power plant, there is a need to provide an improved reformer which tends to decrease the cost and complexity of the power plant and is self-sufficient in water.

It is, therefore, an object of the present invention to provide a fuel reformer which is of compact and relatively simple construction.

It is a further object of the present invention to provide a fuel reformer in which combustion products are efficiently utilized to promote vaporization of the fuel to be reformed and reformation of the vaporized fuel within the unit.

SUMMARY OF THE INVENTION

In accordance with the principles of the present invention, the above and other objectives are realized in a fuel reformer comprised of first, second, third, fourth and fifth annular chambers. The first chamber communicates with a source of combustion products at its bottom end and at its top end with the top end of the second annular chamber which it surrounds. The second chamber, in turn, surrounds the third, fourth and fifth chambers and its bottom end communicates with the bottom end of the third chamber. The fourth chamber surrounds the third chamber and is itself surrounded by the fifth chamber. The bottom end of the latter chamber communicates with the bottom end of the fourth chamber.

A reforming catalyst is disposed in the fifth chamber and a wick in the fourth chamber. A fuel inlet means at the top end of the fourth chamber delivers fuel to be reformed to the wick. Similarly, a combustion products inlet means delivers exhausted combustion products to the fourth chamber from an outlet means at the top end of the third chamber. The recycled combustion products contain heat which promote vaporization of the fuel traveling downwardly through the wick in the fourth chamber and contain steam which promote reforming of the vaporized fuel traveling upwardly through the catalyst in the fifth chamber. Heat is also supplied to the fourth and fifth chambers for vaporization and reformation by the simultaneously traveling combustion products moving upwardly through the first chamber, downwardly through the second chamber and upwardly through the third chamber.

With the above reformer configuration, the reformer is of compact and simple configuration. Furthermore, the configuration allows the combustion products to be efficiently used to promote the reforming and vaporizing processes. An overall more desirable reformer thereby results.

BRIEF DESCRIPTION OF THE DRAWINGS

The above and other features and aspects of the present invention will become more apparent upon reading the following detailed description in conjunction with the accompanying sole drawing which illustrates a reformer in accordance with the principles of the present invention.

DETAILED DESCRIPTION

Figure 1:
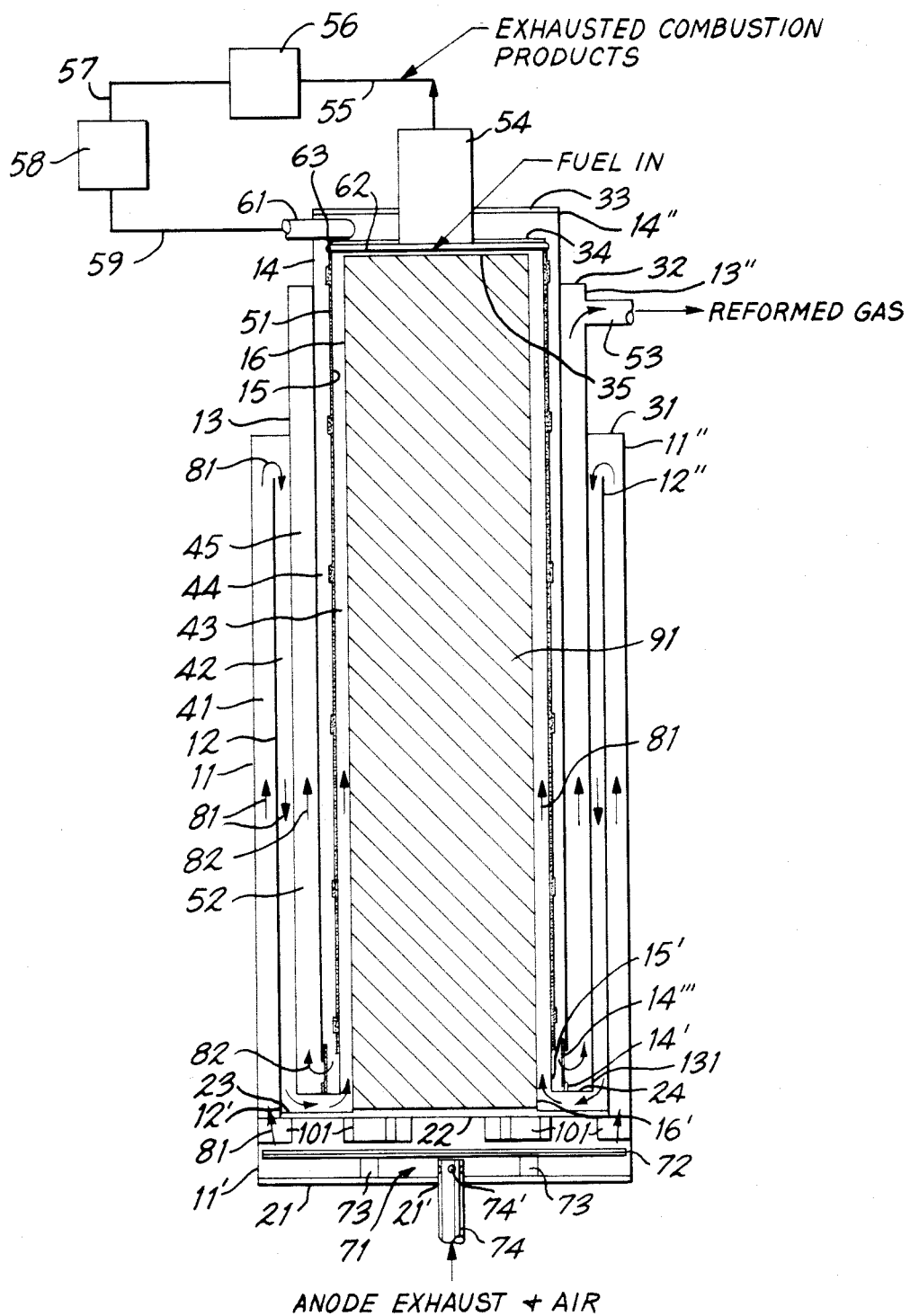

In FIG. 1, a reformer 1 in accordance with the principles of the present invention is illustrated. The reformer 1 comprises a plurality of concentric, cylindrical side walls 11, 12, 13, 14, 15 and 16 of different longitudinal extent. As shown, the side wall 11 extends from a bottom wall 21 which closes the interior space defined by the bottom end 11' of the side wall.

Further bottom walls 22 and 23 are supported in line on brackets 101 above and spaced from the bottom wall 21. The bottom wall 22 is situated at the bottom end 16' of the wall 16 and closes off the interior space of the wall at this point. The wall 23, in turn, connects the bottom ends 16' and 12' of the walls 16 and 12. Spaced above the wall 23 is another bottom wall 24 which connects the bottom ends 13', 14' and 15' of walls 13, 14 and 15.

Top walls 31, 32, 33, 34 and 35 are also provided to connect certain of the side walls and to close off certain of the interior spaces defined thereby. More particularly, as shown, top wall 31 connects the top end 11" of side wall 11 to a point on side wall 13 which is above the top end 12" of side wall 12 and below the top end 13" of the side wall 13. Top wall 32 connects the top end 13" of side wall 13 to a point on wall 14 below the top end 14" of such wall. The other top walls 33, 34 and 35, in turn, close off the top ends of the interior spaces defined by the walls 14, 15 and 16, respectively.

The aforesaid configuration of top, bottom and side walls defines five annular 41-45 chambers which are interconnected and arranged in a particular manner. The chamber 41 surrounds the chambers 42-45, while the chamber 42 surrounds the chambers 43-45. The chamber 43 is the innermost chamber and its bottom end is connected to the bottom end of chamber 42. The chambers 44 and 45 surround the chamber 43 in succession and are interconnected by perforations 14''' in the bottom end 14' of side wall 14.

The chamber 44 has disposed therein a wick 51 which runs along the length of the surface of the side wall 15 interior of the chamber. A catalyst 52 is housed within the chamber 45, the top end of which communicates with a conduit 53 passing through the wall 13. A further conduit 54 passes through the top walls 33 and 34 to a point above the top wall 35, thereby communicating with the chamber 43.

The conduit 54 is further coupled by line 55, heat exchanger 56, line 57, blower 58, and line 59 to a conduit 61. The latter conduit enters the wall 14 at its top end 14" below top wall 33. The conduit 61 thus communicates with the chamber 44. A further conduit 62 encircles the top edge of wall 15 and has apertures 63 distributed around its circumference. The apertures overlie the top edge of the wick 51.

Housed within the space between the bottom wall 21 and bottom walls 22, 23 and 24 is a catalytic combustor 71. The combustor 71 comprises a combustor assembly 72 formed of a porous stainless steel matrix carrying a catalyst and sandwiched between two porous stainless steel plates. The assembly 72 is connected together by screws which connect to posts 73 which are mounted on wall 21. An inlet tube 74 having apertures 74' in its upper end passes through an aperture 21' in bottom wall 21 and provides means for carrying gas to the assembly 72.

Operation of the reformer 1 will be described in conjunction with use of the reformer in a fuel cell power plant where the anode exhaust gases of the fuel cells are mixed with oxidant to provide input gases for the combustor 71 and wherein the reformed gas produced by the reformer is to be used for fuel process gas. More particularly, the mixture of anode gases and oxidant is delivered via aperture 74' of the inlet tube 74 to the combustor assembly 72. The combustion burns the hydrogen in the fuel cell anode exhaust to provide a combustion products stream 81 which includes heated water in the form of steam. The stream 81 travels upward through chamber 41, then downward through chamber 42, then upward through chamber 43 and out of the reformer through conduit 54. In moving through these chambers the stream imparts heat to the adjacent wick and catalyst containing chambers 44 and 45.

The chamber 45, in turn, is supplied the hydrocarbon containing liquid fuel to be reformed. This fuel enters the wick 51 in the chamber 44 via the conduit 62 and apertures 63. The chamber 44 also receives a portion of the combustion products exhausted from the reformer through conduit 54, via conduit 55, heat exchanger 56, conduit 57, blower 58, conduit 59 and conduit 61.

The stream of fuel and combustion products 82 in passing through chamber 44 is heated by the heat imparted to the chamber by the stream 81. This causes vaporization of the fuel in the stream 82. The stream 82 then passes into chamber 45 where the vaporized fuel in the presence of catalyst 52 and the steam in the recycled combustion products is reformed to produce reformed gas including hydrogen and carbon monoxide. This reformed gas undergoes a further shift reaction wherein the carbon monoxide is converted to additional hydrogen and $CO_2$. This occurs as the gas proceeds through the upper part of chamber 45 which is cooler than the lower part, since it is not adjacent the chamber 42 which is made shorter than chamber 45 to avoid heating the upper part of the latter chamber with the combustion products. The gas exiting chamber 45 via conduit 53 is thus substantially completely reformed.

As can be appreciated, therefore, the reformer 1 provides a compact simple configuration for reforming fuel for fuel cell power plants. Additionally, the configuration efficiently and effectively uses combustion products to promote both vaporization and reformation.

It should be noted that the reformer of the invention is particularly advantageous when the liquid fuel to be reformed is methanol. Furthermore, it should be noted that the catalytic combustor 71 is of the same type as disclosed in copending U.S. patent application Ser. No. 935,181, entitled Catalytic Combustor, filed concurrently herewith and assigned to the same assignee hereof.

In all cases, it is understood that the above-identified arrangements are merely illustrative of the many possible specific embodiments which represent applications of the present invention. Numerous and varied other arrangements can readily be devised without departing from the spirit and scope of the invention. Thus, for example, the interior space defined by the inner cylindrical wall 16 can be insulated so as to avoid the escape of heat by providing a plug of insulation 91 as shown in the drawing. Also, the exterior of wall 11 can be insulated to achieve the same purpose. Additionally, the bottom walls 22 and 23 can be formed as a common wall.

What is claimed is:
1. A methanol fuel reformer comprising:
a first bottom wall;
a first cylindrical side wall extending upwardly from said bottom wall;
a second cylindrical side wall interior of and spaced from said first cylindrical wall, the bottom end of said second cylindrical side wall being above the bottom end of said first cylindrical side wall and the top end of said second cylindrical side wall being below the top end of said first cylindrical side wall;
a third cylindrical side wall interior of and spaced from said second cylindrical side wall, the bottom end of said third cylindrical side wall being above the bottom end of said second cylindrical side wall and the top end of said third cylindrical side wall being above the top end of said second cylindrical side wall;
a fourth cylindrical side wall interior of and spaced from said third cylindrical side wall, the bottom end of said fourth cylindrical side wall being perforated and extending to the bottom end of said third cylindrical side wall and the top end of the fourth cylindrical side wall being above the top end of the third cylindrical side wall;
a fifth cylindrical side wall interior of and spaced from said fourth cylindrical side wall, the bottom end of said fifth cylindrical side wall extending to the bottom end of said fourth cylindrical side wall and the top end of the fifth cylindrical side wall extending to a point between the top end of the fourth cylindrical side wall and the top end of the third cylindrical side wall;
a sixth cylindrical side wall interior of and spaced from said fifth cylindrical side wall, the bottom end of said sixth cylindrical side wall extending to the bottom end of the second cylindrical side wall and the top end of the sixth cylindrical side wall extending to a point below the top end of the fifth cylindrical side wall;
a first top wall connecting the top end of said first cylindrical side wall to said third cylindrical side wall at a point below the top end of said third cylindrical side wall;
a second top wall connecting the top end of said third cylindrical side wall to said fourth cylindrical side wall at a point below the top end of said fourth cylindrical side wall;
a third top wall situated at the top end of said fourth cylindrical side wall closing the top end of the interior space defined by said fourth cylindrical side wall;

a fourth top wall situated at the top end of said fifth cylindrical side wall closing the top end of the interior space defined by said fifth cylindrical side wall;

a fifth top wall situated at the top end of said sixth cylindrical side wall closing the top end of the interior spaced defined by said sixth cylindrical side wall;

a second bottom wall connecting the bottom ends of said third, fourth and fifth cylindrical side walls;

a third bottom wall connecting the bottom ends of the second and sixth cylindrical side walls;

a fourth bottom wall situated at the bottom end of said sixth cylindrical wall closing the bottom end of the interior space defined by said sixth wall;

said first and second cylindrical side walls forming a first annular chamber, the bottom end of said first annular chamber being in communication with a source of combustion products;

said second and third cylindrical side walls forming a second annular chamber surrounded by said first annular chamber, the top end of said second annular chamber being in communication with the top end of said first annular chamber;

said fifth and sixth cylindrical side walls forming a third annular chamber surrounded by said second annular chamber, the bottom end of said third annular being in communication with the bottom and of said second annular chamber;

said fourth and fifth cylindrical side walls forming a fourth annular chamber in surrounding relationship to said third annular chamber and surrounded by said second annular chamber, said fourth annular chamber having a wick disposed therein;

said third and fourth cylindrical side walls forming a fifth annular chamber in surrounding relationship to said fourth annular chamber and surrounded by said second annular chamber, the bottom end of said fifth annular chamber being in communcation with the bottom end of said fourth annular chamber;

a catalyst disposed in said fifth annular chamber;

combustion products exhaust means communicating with the top end of said third annular chamber for exhausting combustion products from said third annular chamber;

fuel inlet means communicating with the top end of said fourth annular chamber for delivering fuel to said wick;

combustion products inlet means communicating with the top end of said fourth annular chamber and said exhaust means for delivering exhausted combustion products to said fourth annular chamber; and reformed gas outlet means communicating with the top end of said fifth annular chamber for extracting reformed gas from said fifth chamber.

2. A fuel reformer in accordance with claim 1 wherein:
said combustion products inlet means comprises a heat exchanger followed by a blower.

3. A fuel reformer in accordance with claim 1 wherein:
said third annular chamber surrounds a space;
and said fuel reformer further comprises insulating means disposed in said space.

4. A fuel reformer in accordance with claim 1 further comprising:
a combustor disposed at the lower end of said first chamber for generating said combustion products.

5. A fuel reformer in accordance with claim 4 wherein:
said combustor includes a catalytic burner which burns hydrogen in the presence of an oxidant to generate said combustion products.

6. A fuel reformer in accordance with claim 1 wherein:
said wick is disposed adjacent the surface of said fifth side wall facing said fourth side wall;
said fuel inlet means comprises a tube mounted on the top end of said fifth side wall having apertures in the portions thereof adjacent said wick for conveying said fuel to said wick;
said combustion products inlet means comprises a conduit passing into said fourth side wall below said third top wall;
said combustion products exhaust means comprises a tubular member extending through said third and fourth top walls to a point above said fifth top wall;
said reformed gas outlet comprises a tubular member passing into said third side wall at the top end of said third side wall.

7. A fuel reformer in accordance with claim 6 further comprising:
a combustor disposed in the space between said first bottom wall and said third bottom wall for burning hydrogen with oxidant to generate said combustion products.

8. A fuel reformer in accordance with claim 7 further comprising:
insulation filling the space surrounded by said sixth side wall.

9. A fuel reformer in accordance with claim 5 wherein:
said catalytic burner comprises: a porous stainless steel matrix carrying a catalyst; first and second porous stainless steel plates sandwiching the matrix; and means for supplying a mixture of oxidant and hydrogen to said matrix.

10. A fuel reformer in accordance with claim 9 wherein:
said catalytic burner further comprises means for connecting said sandwich of matrix and plates together and to said lower end of said first chamber;
and said means for supplying said mixture comprises a tubular member spaced from the bottom of said matrix and plates and having an aperture in its upper end.

* * * * *